University States Patent  
Hasemann

(10) Patent No.: US 8,315,610 B2  
(45) Date of Patent: Nov. 20, 2012

(54) METHOD AND SYSTEM FOR USING LOCATION-BASED SERVICES FOR MOBILE TERMINALS

(75) Inventor: Joerg-Michael Hasemann, Emtinghausen (DE)

(73) Assignee: Deutsche Telekom AG, Bonn (DE)

( * ) Notice: Subject to any disclaimer, the term of this patent is extended or adjusted under 35 U.S.C. 154(b) by 632 days.

(21) Appl. No.: 11/997,063

(22) PCT Filed: Jul. 22, 2006

(86) PCT No.: PCT/DE2006/001271
§ 371 (c)(1),
(2), (4) Date: Mar. 12, 2008

(87) PCT Pub. No.: WO2007/012310
PCT Pub. Date: Feb. 1, 2007

(65) Prior Publication Data
US 2008/0200155 A1 Aug. 21, 2008

(30) Foreign Application Priority Data
Jul. 28, 2005 (DE) .......................... 10 2005 035 287

(51) Int. Cl.
*H04M 7/10* (2006.01)

(52) U.S. Cl. ............... 455/414.2; 455/404.2; 455/414.3; 455/456.1; 455/456.2; 455/456.3

(58) Field of Classification Search ............ 455/414.1, 455/414.2, 414.3, 415
See application file for complete search history.

(56) References Cited

U.S. PATENT DOCUMENTS

| 5,752,188 | A | * | 5/1998 | Astrom et al. | 455/433 |
| 6,330,445 | B1 | * | 12/2001 | Skog et al. | 455/433 |
| 6,603,968 | B2 | * | 8/2003 | Anvekar et al. | 455/433 |
| 7,533,058 | B2 | * | 5/2009 | Kulakowski | 705/40 |
| 2003/0036379 | A1 | | 2/2003 | Nikolai et al. | |
| 2004/0116128 | A1 | * | 6/2004 | Chen | 455/456.1 |

FOREIGN PATENT DOCUMENTS

| WO | WO9741654 A | 11/1997 |
| WO | WO9821913 A | 5/1998 |
| WO | WO2005015926 A | 2/2005 |

OTHER PUBLICATIONS

"Digital Cellular Communications System (Phase +2)", ETSI Standards, European Telecommunications Standards Institute, Sophia-Antipo, FR, vol. 3-SA1, No. V600, Jan. 2005, XP014027409 ISSN: 0000-0001 paragraphs [5.1.2], [5.1.4].

* cited by examiner

*Primary Examiner* — Olumide T Ajibade Akonai  
*Assistant Examiner* — Randy Peaches  
(74) *Attorney, Agent, or Firm* — Kenyon & Kenyon LLP

(57) ABSTRACT

A system and method is provided for using location-based services (LBS) for mobile terminals of a mobile telephony network, a user dispatching an information request via the mobile terminal for information matched to the location of the user; the user dispatching the information request as an USSD code which belongs to a class of USSD codes specified in the mobile telephony network for location-based services (LBS-USSD), so that a USSD handler of network operator identifies the incoming USSD code for location-based services (LBS-USSD) and routes them on together with the address of the requesting user to an LSB further processing entity (WVI), by which the USSD code for location-based services (LBS-USSD) is interpreted with the aid of the parameterization, and the matching location-based information is made available for transmission to the user.

11 Claims, 1 Drawing Sheet

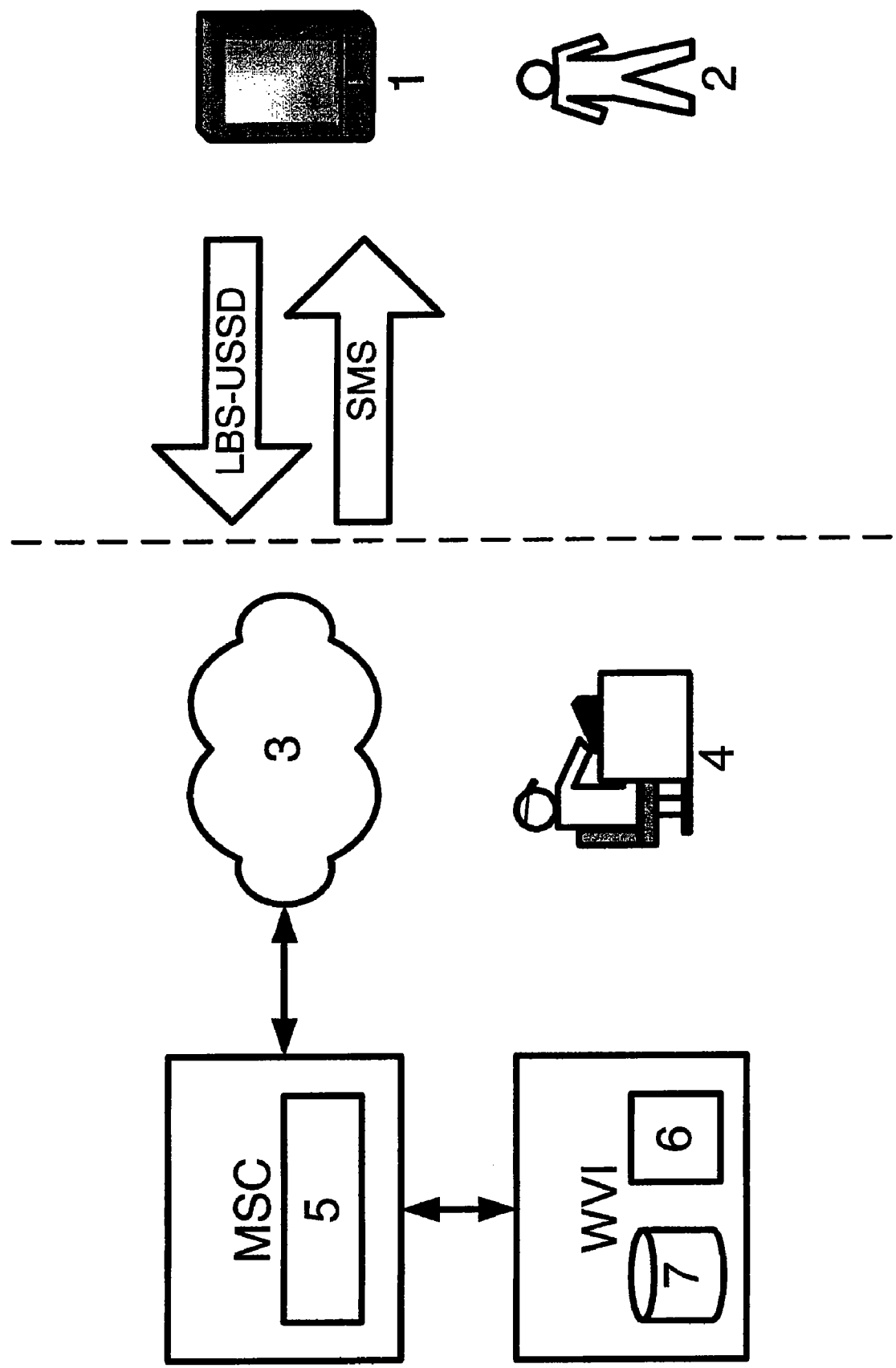

METHOD AND SYSTEM FOR USING LOCATION-BASED SERVICES FOR MOBILE TERMINALS

FIELD OF INVENTION

The present invention relates to a method and a system for mobile terminals of a mobile telephony network, the mobile terminal being used to dispatch an information request for information agreed as to the place of location of the user.

BACKGROUND INFORMATION

A location based service (LBS) refers to a fixed location service of a mobile telephony provider, who supplies information agreed as to the place of location of the user. In this connection, the place of location of the user and the place of his mobile terminal are identical. Mobile telephony providers usually make available the current position of the mobile terminal at the time of the call. The position is given, in this instance, by the mobile telephony cell in which the mobile terminal has logged in. Each telephony cell has a unique identification number, which makes possible a rough position finding of the terminal. The position finding accuracy made available depends on the size of the mobile telephony cell, and in an urban area this is about 100 meters in mobile telephony standard GSM.

According to the related art, the use of location-based services takes place mostly via an SMS dialog between the user and the service provider. As an alternative to that, the use via Web Dialog/WAP Dialog is also possible. In the first-named case, the user sends, for example, an SMS (short message service) via the mobile terminal, with the message "money" to a service call number, and receives by SMS a list of the nearest automatic teller machines. However, this type of utilization is rather cumbersome and tedious. In certain situations of use, such as behind the steering wheel of a motor vehicle, such a utilization is not even possible.

In United States Patent Publication No. 2003/0036379 A1, a method and a system for using location-based services for mobile terminals is provided. That reference appears to concern the mobile telephony network which constantly transmits information about available location-based services in the current area of location of the terminal. To do this, for example, the mobile telephony network radiates an indicator signal to the mobile terminal, which shows symbols (pictograms) on the display of the mobile terminal that correspond to the available location-based services. The type of location-based service offered may be recognizable from the configuration of the symbols. The user now has the possibility of making a selection of location-based services that interest him, and that are currently available, in order to use them. However, there is some difficulty in distinguishing accurately between location-based services supplied, if very many location-based services of different contents are offered in the symbol display. Further, the size of the display of the mobile terminal limits the number of available location-based services that may be seen at a glance.

SUMMARY OF INVENTION

Embodiments of the present invention provide for a place of location of a user to be determined via a GPS module integrated into the terminal. The palette of generally known location-based services may be used in enterprises, in the service providing field and for private use. The information that is the subject matter of a private location-based service may be, for example, about the nearest automatic teller machine to the mobile terminal.

Embodiments of the present invention provide for a method and a system for using location-based services for mobile terminals, which may be implemented in terms of device technology and minimum expenditure, and which may permit a simple utilization of location-based services.

Embodiments of the present invention provide the teachings of method technology that the information request is dispatched as a USSD code (unstructured supplementary service data), which is a member of a class USSD codes for location-based services specified in the mobile telephony network, so that, because of a USSD handler of the network operator, the incoming USSD code for location-based services is identified and is routed on to an LSB further processing entity, together with the address of the requesting user, by which the USSD code for location-based services is interpreted with the aid of its parameterization, and the location-based information matching it is made available for dispatch to the user.

Embodiments of the present invention provide for easy implementation with respect to device technology, based at least in part that available GSM/GPRS/UMTS terminals support the USSD standard. No hardware or software-related change is required on the mobile terminal, nor on its profiles or SIM card. In an embodiment, the user only has to know which USSD code stands for which service, facilitating easy use. In an embodiment, the processing of USSD codes in the mobile telephony network is many times faster than the processing of SMS messages. Consequently, the user receives the information requested by him very fast. In an embodiment, according to the standard, since a USSD code includes an authentication of the user/mobile terminal, additional authentication measures are not required, on the path of invention, for the use of location-based services. Since the contents are transmitted in a coded manner over USSD codes, embodiments of the present invention are secure from unauthorized access by third parties. In an embodiment, the USSD infrastructure is present with network operators to the greatest extent; this makes possible, for example, call forwarding (**21*destination directory number *#).

In an embodiment, the requested location-based information is sent to the user, graphically edited via SMS/MMS.

In an embodiment, one may prepare the requested location-based information acoustically, and send it to the address of the user by voice call. The user is able to listen to the desired information with one call. Via the syntax of the USSD code, it is possible, in this case, for the user to select whether he wishes to receive the requested information graphically or acoustically, or in another way. For the selection of the graphic or acoustic preparation of the requested location-based information for the user, the USSD code maintains at least one corresponding parameter that the user is able to select.

In an embodiment, the user may select, in a manner explained above, whether he wishes to receive the requested location-based information once or several times. This is useful, e.g., if the user of the mobile terminal has not activated a call-answering function for storing his own calls, and the requested location-based information is to be received acoustically.

In an embodiment, as the address of the requesting user, the MSISDN (mobile subscriber number) of the mobile terminal is used over which the current place of location of the mobile terminal is ascertained. This is coded in the MSISDN, so that no further measures are required for ascertaining the current place of location for the data processing.

The method according to the present invention may be implemented by a systems technology involving the generally available USSD infrastructure of a mobile telephony network. In the USSD standard, a transmission service is involved, that was specially developed for GSM, which supports other than additional services implemented by GSM signaling, and makes possible especially simple utilization of the same. The access numbers for services based on the USSD standard have a data format in which the star key and the number (or pound) key on the mobile terminal are used. Consequently, it is possible, when using the USSD standard, to obtain access to preconfigured, operator-specific services, e.g., as with the embodiments of the present invention. For the production of the location-based service according to the present invention, while using the USSD standard, the network operators have to use their own addressing resources which are not controlled or managed by the national regulation authorities. Only the USSD handler of the network operator has to be adapted to the data processing for the purpose of filtering incoming USSD codes for location-based services (LBS-USSD). An LSB further processing entity (WVI) is provided, which interprets the USSD code standing for a location-based service corresponding to its parameterization, and makes available the location-based service matching this, for transmission to the user.

The USSD handler of the network operator, according to the subject matter of the present invention, is preferably integrated into a mobile telephony exchange (MSC), a visitor location register (VLR) or a home location register (HLR) of the mobile telephony network constructed according to the GSM/3GPP standard. The system components mentioned above are generally known in mobile telephony technology. Mobile telephony exchange (MSC) is an intelligent exchange system in GSM networks. The exchange system produces the connection between the mobile terminals. For this purpose, the mobile telephony exchange first switches a connection to the base station, and from there on, the radio contact to the other terminal is produced. A mobile telephony exchange has a plurality of data banks in which user data are stored in home location register (HLR) and data of visitors are stored in visitor location register (VLR). In the home location register, all the data concerning the mobile subscriber is stored which are to be assigned to a certain stationary region. These subscriber data are used, among other things, for the connection setup and for the providing of service. In the visitor location register data are stored which are relevant for calls. Consequently, the visiting location register includes data on logged-on mobile terminals and their users.

The LBS further processing entity (WVI) according to the subject matter of the present invention preferably includes an LBS server for the interpretation and execution of the data request of the user, the LBS server being connected to a data bank which includes the current location-dependent information. Because of this architecture, it is, for instance, also advantageously possible that an LBS further processing entity is able to be used by a plurality of network operators. An LBS further processing entity that is central from that point of view, for this purpose has to be coupled to one or more USSD handlers of a network operator, for example, in the area of the mobile telephony exchange (MSC).

The class of USSD specified, and, this being the case, reserved in the mobile telephony networks of a network operator, for location-based services may be used, for example, to designate at least one of the following location-based services mentioned:

information on available location-based information (table of contents)
nearest hotel
nearest gasoline service station
nearest tourist information office
information on traffic/traffic jams
nearest current public event A further advantage of the design approach according to the present invention results from the fact that a USSD code, favored by a user, for a certain location-based service often used by him may be stored on a particular abbreviated dialing key of the mobile terminal. By this method, the favored USSD code may be activated by a one-time pressing of the key on the mobile terminal, and the requested information will be available to the user particularly promptly.

Besides that, it is also possible to store the USSD codes for location-based services, favored by the user, in the telephone directory of the mobile terminal. This alternative variant makes sense particularly in the case in which many USSD codes are of interest to a user.

Other refinements of the present invention are explained in greater detail in the following, along with the description of a preferred exemplary embodiment of the present invention, with reference to the only FIGURE. The FIGURE shows a schematic block diagram of a system for using location-based services for mobile terminals.

According to the FIGURE, for the utilization of a location-based service, an information request is dispatched via mobile terminal 1 of a user 2 according to information agreed as to the place of location of the user 2, in this instance, "nearest automatic teller machine", via a mobile telephony network. User 2 uses a USSD code for this which is reserved in a class of reserved USSD codes for location-based services in mobile telephony network 3 of network operator 4, hereinafter called LBS-USSD. In the example mentioned here, the request for information is for "nearest" automatic teller machine, namely, LBS-USSD "#440#". In this connection, the first digits "44" stand for the type of the requested location-based service, namely "nearest automatic teller machine", whereas the last digit "0" states that the requested location-based information is to be prepared in text, on the part of network operator 4, and is to be transmitted by SMS to the address of user 2, that is, to his terminal 1. The address of requesting user 2 is transported during the course of the request via the mobile subscriber number (MSISDN) of mobile terminal 1, via which the current place of location of the mobile terminal may also be ascertained. Thus, network operator 4 has available all the data for the automatic processing of the information request by user 2.

The information request by user 2 is entered in mobile telephony exchange MSC by network operator 4. A USSD handler 5 is integrated into this, which recognizes the incoming LBS-USSD code as an information request for a location-based service, and which reroutes the request to LBS further processing entity WVI created for this. WVI includes an LBS server 6 to which a data bank 7 is connected. LBS server 6 is used for the interpretation and execution of the information request "nearest automatic teller machine" by user 2. In connected data bank 7, information is stored by data set on information that is place of location-dependent and ranked by service classes. Data on places of location of automatic teller machines are stored herein in the mobile telephony cells of mobile telephony network 3. Corresponding to the information request, LBS server 6 selects from the data bank "nearest automatic teller machine", i.e., a short route description to an automatic teller machine which is located in the current mobile telephony cell of mobile terminal 1. In an embodiment, the information thus selected is routed on to mobile telephony exchange MSC, prepared in it textually as SMS, and transmitted to mobile terminal 1 of user 2, as the reply to his information request.

The present invention is not limited to the exemplary embodiments described above. Rather, modifications thereof are also possible. Thus, for example, the localization of mobile terminal 1 does not necessarily have to take place via MSISDN of mobile terminal 1. In an embodiment, a GPS-capable mobile terminal is used. This makes a far more accurate determination of the current place of location of user 2 possible, which correspondingly increases the quality of the location-based service. An embodiment of the present invention is open to all possible location-based services of the type that is of interest here, whether already available or to be developed in the future.

What is claimed is:

1. A method for using location-based services (LBS) for mobile terminals of a mobile telephony network,
   an information request being dispatched via the mobile terminal for information agreed as to the place of location of the user,
   wherein the information request is dispatched as a USSD code, which belongs to a class of USSD codes specified in the mobile telephony network for location-based services (LBS-USSD), the incoming USSD code for location-based services (LBS-USSD) being identified by a USSD handler of the network operator and being routed on together with the address of the requesting user to an LBS further processing entity (WVI), by which the USSD code for location-based services (LBS-USSD) is interpreted with the aid of the parameterization and the matching location-based information is made available for transmission to the user,
   wherein the mobile subscriber number (MSISDN) of the mobile terminal is used as the address of the requesting user, via which the current place of location of the mobile terminal is ascertained,
   wherein the LBS further processing entity (WVI) includes an LBS server for the interpretation of and execution of the information request, the LBS server being connected to a databank which includes the current location-dependent information, and
   wherein the USSD code for location-based services (LBS-USSD) includes a parameter inputtable to indicate one of a one time and a multiple request to receive the location-based information.

2. The method as recited in claim 1, wherein the requested location-based information is prepared graphically and transmitted by SMS/MMS to the address of the user.

3. The method as recited in claim 1, wherein the requested location-based information is prepared acoustically and transmitted by a voice call to the address of the user.

4. The system as recited in claim 1, wherein, the USSD codes for location-based services (LBS-USSD) are storable in the telephone directory of the mobile terminal.

5. A system for using location-based services (LBS) for mobile terminals of a mobile telephony network,
   a user dispatching an information request via the mobile terminal for information agreed as to the place of location of the user,
   wherein the user dispatches the information request as an USSD code which belongs to a class of USSD codes specified in the mobile telephony network for location-based services (LBS-USSD), so that a USSD handler of the network operator identifies the incoming USSD code for location-based services (LBS-USSD) and routes it on together with the address of the requesting user to an LSB further processing entity (WVI), by which the USSD code for location-based services (LBS-USSD) is interpreted with the aid of the parameterization, and the matching location-based information is made available for transmission to the user,
   wherein the mobile subscriber number (MSISDN) of the mobile terminal is used as the address of the requesting user, via which the current place of location of the mobile terminal is ascertained,
   wherein the LBS further processing entity (WVI) includes an LBS server for the interpretation of and execution of the information request, the LBS server being connected to a databank which includes the current location-dependent information, and
   wherein the USSD code for location-based services (LBS-USSD) includes a parameter inputtable to indicate one of a one time and a multiple request to receive the location-based information.

6. The system as recited in claim 5, wherein the USSD handler of the network operator is integrated into a mobile telephony exchange (MSC), a visitor location register (VLR) or a home location register (HLR) of the mobile telephony network constructed according to the GSM/3GPP standard.

7. The system as recited in claim 5, wherein the LBS server handles the interpretation and execution of the information request of the user.

8. The system as recited in claim 5, wherein the class of USSD codes specified in the mobile telephony network for location-based services (LBS-USSD) characterizes at least one of the location-based services: "information on available location-based information", "nearest hotels", "nearest gasoline service stations", "nearest tourist information office", "information on traffic/traffic jams", and "nearest current public events".

9. The system as recited in claim 5, wherein, for the selection of one of: a graphic and acoustic preparation of the requested location-based information for the user, the USSD code for location-based services (LBS-USSD) includes a corresponding parameter that the user is able to select.

10. The system as recited in claim 5, wherein the parameter is inputtable by the user.

11. The system as recited in claim 5, wherein a USSD code for a location-based service (LBS-USSD) is storable on a quick dialing key of the mobile terminal.

* * * * *